Oct. 28, 1969   LEROY C. LAIG   3,475,716
RETAINER FOR ELECTRIC CORD CONNECTORS
Filed Dec. 8, 1967
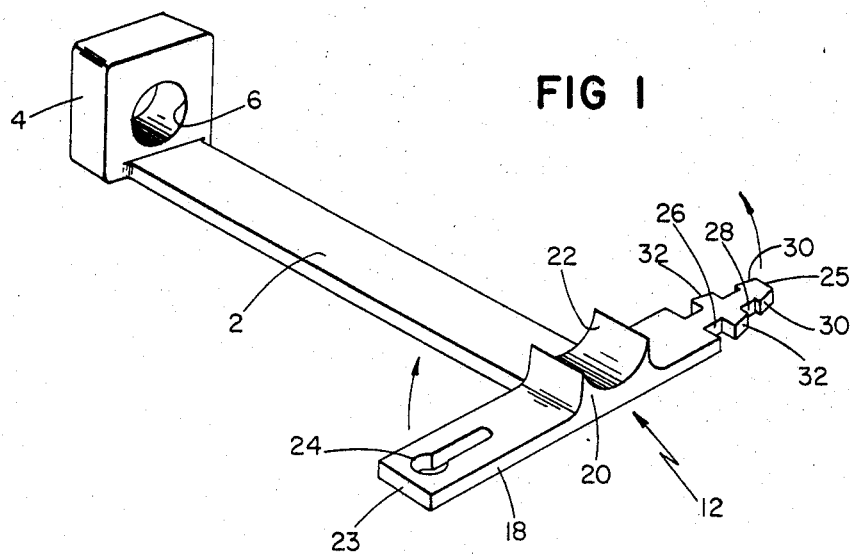
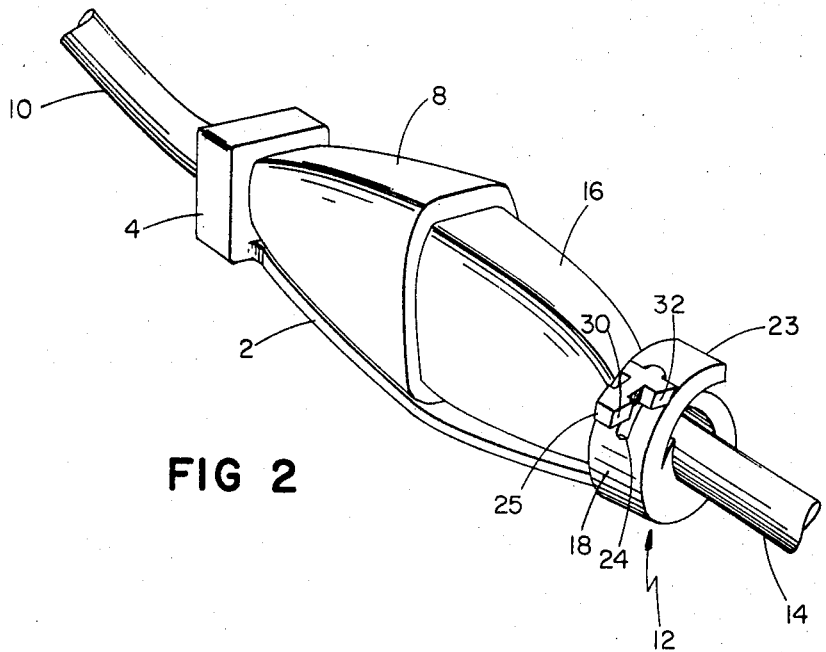

_United States Patent Office_

3,475,716
Patented Oct. 28, 1969

3,475,716
RETAINER FOR ELECTRIC CORD CONNECTORS
Leroy C. Laig, Cumberland, R.I., assignor to Miller Electric Co., Woonsocket, R.I., a corporation of Rhode Island
Filed Dec. 8, 1967, Ser. No. 689,035
Int. Cl. H01r *13/54;* B65d *63/10;* F16g *11/02*
U.S. Cl. 339—75                    1 Claim

ABSTRACT OF THE DISCLOSURE

A retainer for preventing accidental pulling apart of a plug and socket connecting the ends of electrical conductors comprising a strap having at one end means for connecting it to one conductor and at the other end a fastener for detachably connecting it to the other conductor.

---

The present invention relates to connectors for electrical conductors and more particularly to an accessory, for use with the otherwise ordinary connector comprising a plug and a socket, in the form of a retainer for preventing accidental disconnection of the two parts of the connector.

Electrical appliances which are portable are coming into ever widening use. With many such portable appliances, for example hedge trimmers, electric lawn mowers, and electrical hand tools such as saws and planes, the appliance itself is usually provided with a relatively short power supply cord terminating in a plug or cap, as it is customary for the user when necessary to supply an extension cord which he plugs at one end into an electrical outlet and into the other end of which he plugs the appliance, to allow the appliance to be moved about and used at any point within a greater distance from the outlet than the appliance cord would permit. An ever present problem in such circumstances is the annoyance caused by the connection between the extension cord and the appliance becoming accidentally disconnected as the user of the appliance moves around in using it or has occasion to drag the supply cord after him in his work so that the connector may snag and cause the plug to pull out of the socket. Various efforts to solve this problem have been made but none of the results has been wholly satisfactory. Constructing the plugs and sockets so that they afford greater resistance against being pulled apart mainly only adds to the inconvenience of disconnecting the connector when it is intentionally disconnected, as, usually, the force applied to the connector, by snagging of the connector as the appliance is carried about or the force applied when the user attempts to move the tool beyond the normal length provided by the extension cord, is great enough to cause disconnection of any connector designed to be pulled apart by hand. Heretofore known attachments of one form or another intended to hold the parts of a connector together are unsatisfactory in that they cannot be found when needed, or may damage the connector or the conductors leading to it, or may tend to obscure or hide the connector so that the operator cannot tell at a glance whether it is connected or not connected, or have various other disadvantages.

The present invention has as an object to provide a very simple yet highly effective retainer for preventing accidental disconnection of electrical connectors.

Another object of the invention is to provide a retainer for preventing accidental disconnection of electrical connectors which will retain the two parts of the connector snugly in connected condition while leaving the relationship of the parts of the connector clearly visible to the operator.

A further object of the invention is to provide such a retainer which may conveniently be permanently mounted on a power supply cord of an appliance, or on an extension cord, adjacent the connector member, where it is always instantly available when needed.

The invention provides a retainer of the character described comprising a strap of a flexible, stretchable and elastic material, means attached to one end of the strap for connecting that end of the strap to an electrical conductor and a fastener attached to the other end of the strap for detachably connecting said other end of the strap to another electrical conductor or to disconnect said other end of the strap from the conductor without disconnecting the strap from the first-mentioned conductor. In preferred forms, the retainer of the invention includes a fastener comprising a one piece band disposed transversely of the strap having an elongated keyhole shaped opening at one end and at the other end a member having a series of enlargements thereon adapted to be passed through the elongated opening and turned to prevent withdrawal of the member from the opening. Preferably said band includes near its midportion a raised portion having a cylindrical surface forming a seat for the electrical conductor. In a preferred form, the means for attaching one end of the strap to a conductor includes a continuous wall surrounding an aperture for engaging the conductor which is passed through the aperture, for permanently connecting the strap to the conductor.

Other objects, features and advantages of the invention will become apparent from the following description of an illustrative embodiment in which description reference is made to the accompanying drawing wherein:

FIG. 1 is a perspective view of the retainer; and,
FIG. 2 is a perspective view of an electrical connector with the retainer in position thereon.

Referring to the drawing, the retainer comprises a strap 2 formed from a flexible, stretchable and elastic material, such as rubber or a synthetic rubber, e.g., neoprene, or a plastic, e.g., polyvinyl chloride. The strap 2 has at one end means for connecting it to an electrical conductor comprising an apertured member 4 extending sidewise of the strap 2 and provided with an aperture 6 generally cylindrical in shape and extending entirely through the member 4 with its axis disposed parallel to the strap 2. The aperture 6 is of a size large enough to comfortably receive therein an electrical conductor of the type with which the retainer is to be used but is not so large as to permit the passage therethrough of an electrical connector member, such as a plug 16 on a power supply cord 14, or the socket 8 of an extension cord 10, on which the retainer is shown in FIG. 2 as mounted closely adjacent to the socket. The wall of the member 4 surrounding the aperture 6 is continuous.

Adjacent the other end of the strap 2 is a fastener 12 for detachably connecting the retainer to the electrical conductor entering the other connector member, for example the power supply cord 14 extending from a portable electrical appliance and having on its free end the plug 16, or the extension cord 10 having the socket 8 on its end.

The fastener 12 is formed from a one-piece band 18 having its midportion permanently connected to the end of the strap 2 opposite the end carrying the member 4. The band 18 is relatively wider than it is thick and is provided on one face near its mid portion with a raised portion 20 formed with a cylindrical exposed external surface 22, having its axis parallel to the strap 2, forming a seat for the conductor.

Adjacent its end 23 the band 18 is provided with a keyhole shaped aperture 24 having its narrower portion extending inwardly toward the strap 2. The other end 25 of the band 18 is reduced in width at 26 and 28, in effect providing pairs of enlargements 30 and 32 spaced from each other. The side edges of the band are tapered inwardly toward the end 25 of the band where they form the outer ends of the enlargements 30, 32. The band 18 is formed of a flexible, stretchable and elastic material, for example materials such as those described above for strap 2, whereby the end containing the enlargements 30, 32 may be passed through the aperture 24 upon being twisted through 90° to be passed through the elongated portion of the aperture. After being passed through the aperture, the end may be untwisted back to its initial shape, with the reduced portion 26 or 28 received in the aperture 24 and the enlargements 30 or 32 bearing against the opposite surface of the end 23 so as to connect the ends 23, 25 together, in a detachable manner.

The retainer of the invention may be and desirably is molded in one piece.

The retainer may be mounted on the conductor during manufacture by passing an end of the conductor through the aperture 6 before the electrical connector, e.g., socket 8 or plug 16, is mounted on the conductor. When the electrical connector has been mounted on the conductor the retainer thus is permanently part of the cord and accordingly is always conveniently available for use when needed.

The retainer may be connected to the conductor by molding the member 4 directly to the conductor with a permanent union between the material of the conductor and member 4.

In the use of the retainer, for example when the retainer is mounted on an extension cord 10, and when a portable electrical appliance is to be used with the extension cord 10, the plug 16 of the power supply cord 14 of the appliance is plugged into the socket 8 of the extension cord in the usual manner. The band 18 is brought into position on the cord 14, with slight stretching of the strap 2 if necessary, the seat 22 placed on the cord 14, the ends 23, 25 wrapped about the cord 14 and the end 25 inserted through the aperture 24 by twisting the end 25 as needed to pass it through the aperture and then untwisting it to engage one of the reduced portions 26, 28 in the aperture with the appropriate pair of enlargements 30, 32 seated on the outside of the band 18. In FIG. 2 the enlargements 32 are so seated, as shown. The retainer is now in operating condition. The raised portion 20 and the two ends 23, 25 of the fastener 12 lie adjacent to or engage the plug 16 whereby the strap 2 prevents separation of the plug 16 and socket 8. In this condition, as appears clearly in FIG. 2, neither the strap 2 nor any other part of the retainer interferes with clear observation of the electrical connector with the result that the user can always see it and be reassured that it is securely connected. The length of the strap 2 may be made such that it is continuously under tension when in position on a connector so as to urge the two members of the connector into snug, tight-fitting relationship.

When the connector is to be intentionally disconnected, the end 25 of band 18 may be twisted so as to permit removal of the enlargements 32 or 30, or both, through the aperture 24 to free the end 25 of the fastener 12 from the appliance cord 14. The connector is then disconnected in the usual manner.

When the connector has been disconnected, the fastener 12 may, if desired, be refastened to the cord 14. The strap 2 then keeps the plug 16 in the immediate vicinity of the socket 8 so that the two may be reconnected readily when desired without need for the operator to hunt for either one of them.

It will be seen from the foregoing that the invention has provided a retainer for preventing accidental disconnection of electrical connectors having two cooperating attachable and detachable connector members which is simple and trouble free in design but nevertheless highly effective and efficient in use.

While a particular embodiment of the invention has been described and illustrated in detail, this has been done for the purpose of disclosure of the invention and without any intention to limit the invention thereto.

I claim:

1. A retainer for preventing accidental disconnection of an electrical connector having two cooperating attachable and detachable connector members and an electrical conductor entering each of said members, comprising a strap of a flexible, stretchable elastic material, means attached to one end of said strap for engaging the electrical conductor entering one of the connector members to connect one end of the strap thereto, a fastener attached to the other end of the strap for detachably engaging the electrical conductor entering the other of said connector members to connect the other end of the strap thereto and to disconnect said other end of the strap therefrom without disconnecting the strap from the other conductor, said fastener comprising a one-piece band disposed transversely of said strap having an elongated opening at one end and at the other end a member having a series of enlargements thereon adapted to be passed through said elongated opening and turned relative thereto to prevent withdrawal of the member from said elongated opening, wherein said means includes a continuous wall surrounding an aperture for engaging a conductor passing through the aperture for permanently connecting the strap to said one of the connector members, and wherein said band adjacent its midportion is provided with a raised portion having a cylindrical surface forming a seat for the conductor to be fastened thereto.

References Cited

UNITED STATES PATENTS

| | | |
|---|---|---|
| 2,461,427 | 2/1949 | Kneebone. |
| 2,725,543 | 11/1955 | Tanner. |
| 2,753,536 | 7/1956 | Tjader. |
| 2,774,049 | 12/1956 | Kibler et al. |
| 3,092,163 | 6/1963 | Bunker et al. _____ 152—221 |

MARVIN A. CHAMPION, Primary Examiner

JOSEPH H. McGLYNN, Assistant Examiner

U.S. Cl. X.R.

24—16, 123; 287—90; 339—103